Feb. 27, 1923. 1,446,929.
G. RIVETTA.
HUB FOR CINEMATOGRAPHIC AND PHOTOGRAPHIC FILMS.
FILED APR. 15, 1921.

Inventor
Giovanni Rivetta
By
B. Singer, Atty.

Patented Feb. 27, 1923.

1,446,929

UNITED STATES PATENT OFFICE.

GIOVANNI RIVETTA, OF PARIS, FRANCE.

HUB FOR CINEMATOGRAPHIC AND PHOTOGRAPHIC FILMS.

Application filed April 15, 1921. Serial No. 461,495.

*To all whom it may concern:*

Be it known that I, GIOVANNI RIVETTA, subject of the King of Italy, residing at Paris, France, have invented certain new and useful Improvement in Hubs for Cinematographic and Photographic Films, of which the following is a specification.

Hitherto the spools on which photographic or like films have been wound have been fitted with a complicated arrangement for securing the film thereto.

The spool according to the present invention enables this result to be attained in an extremely simple manner. To that end, the spool has a groove which extends along almost the whole length and the outer portion of which is of a rectilinear cross section lying in a plane which is oblique relatively to a diametrical plane of the spool and has parallel edges. The inner portion of the grooves widens out into a triangular space. The film is folded over at the end and is then inserted in the said groove. When the folded tongue-like portion of the film is inserted in the triangular space of the groove, it straightens owing to its elasticity and presses against one of the sides of a projection in the said space, while the main portion of the film presses against the adjacent side of the projection, so that the film is securely held in position.

A construction according to the present invention is illustrated by way of example in the accompanying drawing in which.

Figure 1:
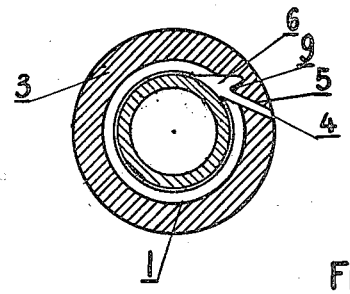
Figure 1 shows a spool in section before the film is inserted.

The spool consists of a metal tube 1 provided with notches 2 which enable it to be driven. A sleeve of ebonite or similar material 3 is forcibly fitted in two portions on the said tube. A groove 4 extends along almost the whole length of the spool. The outer portion of the groove is of a rectilinear cross-section 5 lying in a plane which is oblique relatively to a diametrical plane of the spool passing through the opening of the groove, and the inner portion of the groove widens out into a triangular portion 6.

Figure 2:
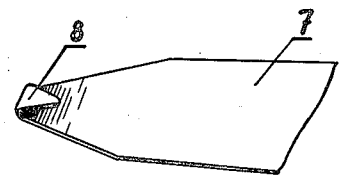
Figure 2 shows the folded end of the film.
Figure 3:
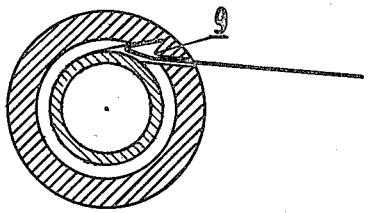
Figure 3 shows the spool in section after the end of the film has been inserted.
Figure 4:
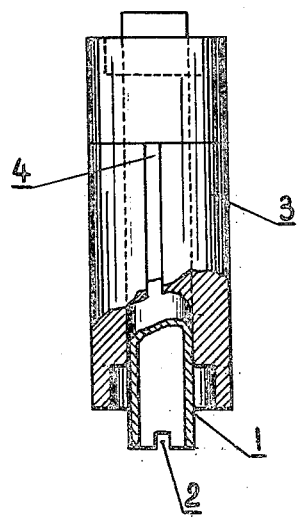
Figure 4 shows the spool in elevation partly in section.

The film 7 (Figure 2) is folded to form a small tongue-like portion 8. It is inserted into the groove 4 until the point of the tongue passes beyond a projection 9 therein. Owing to its elasticity the tongue 8 straightens and presses against one of the sides of the said projection, while the main portion of the film presses against the other side of the projection (Figure 3). Thus, the film is securely held in position.

What I claim is:

A spool for photographic or like films, having a securing groove, the outer part of the said groove being of a rectilinear cross section and lying in parallelism to a plane oblique relatively to a diametrical plane of the spool, and the inner part of the said groove widening out into a triangular portion in which to receive the folded end of the film said folded end being caused to spring out and be held in said triangular portion of the groove by elasticity of said film.

In testimony whereof I have affixed my signature.

GIOVANNI RIVETTA.